US010714717B2

(12) United States Patent
Chen et al.

(10) Patent No.: US 10,714,717 B2
(45) Date of Patent: Jul. 14, 2020

(54) BATTERY MODULE

(71) Applicant: CONTEMPORARY AMPEREX TECHNOLOGY CO., LIMITED, Ningde, Fujian Province (CN)

(72) Inventors: Chuanlian Chen, Ningde (CN); Yanhuo Xiang, Ningde (CN); Derong Wang, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 7 days.

(21) Appl. No.: 15/986,110

(22) Filed: May 22, 2018

(65) Prior Publication Data
US 2018/0269445 A1    Sep. 20, 2018

Related U.S. Application Data

(63) Continuation of application No. PCT/CN2016/075353, filed on Mar. 2, 2016.

(51) Int. Cl.
*H01M 2/02* (2006.01)
*H01M 2/10* (2006.01)
*H01M 2/20* (2006.01)
*H01M 2/26* (2006.01)
*H01M 2/30* (2006.01)
*H01R 4/06* (2006.01)
*H01R 11/28* (2006.01)
*H01M 10/42* (2006.01)
*H01M 10/48* (2006.01)
*B23K 26/24* (2014.01)
*H01R 43/02* (2006.01)
*H01R 43/16* (2006.01)
*H01R 4/62* (2006.01)
*H01R 12/58* (2011.01)

(52) U.S. Cl.
CPC .......... *H01M 2/1077* (2013.01); *B23K 26/24* (2013.01); *H01M 2/202* (2013.01); *H01M 2/206* (2013.01); *H01M 2/26* (2013.01); *H01M 2/30* (2013.01); *H01M 10/425* (2013.01); *H01M 10/4207* (2013.01); *H01M 10/482* (2013.01); *H01R 11/281* (2013.01); *H01M 2/024* (2013.01); *H01M 2/1061* (2013.01); *H01M 2220/20* (2013.01); *H01R 4/06* (2013.01); *H01R 4/62* (2013.01); *H01R 12/585* (2013.01); *H01R 43/0221* (2013.01); *H01R 43/16* (2013.01); *H01R 2201/26* (2013.01)

(58) Field of Classification Search
CPC .. H01M 2/024; H01M 2/1061; H01M 2/1077; H01M 2/202; H01M 2/26; H01M 2/30; H01M 10/4207; H01M 10/425; H01M 10/482; H01M 2220/20; B23K 26/24; H01R 4/06; H01R 4/62; H01R 11/281; H01R 12/585; H01R 43/0221; H01R 43/16; H01R 2201/26

See application file for complete search history.

(56) References Cited

U.S. PATENT DOCUMENTS

| 8,802,275 | B2 | 8/2014 | Kim |
| 8,941,386 | B2 | 1/2015 | Ikeda et al. |
| 2008/0018603 | A1* | 1/2008 | Baraz .................... G06F 1/1615 345/168 |
| 2013/0330602 | A1* | 12/2013 | Tsutsumi ................ H01M 4/70 429/179 |
| 2016/0043446 | A1 | 2/2016 | Fritz et al. |

FOREIGN PATENT DOCUMENTS

| CN | 102598362 A | 7/2012 |
| CN | 103296321 A | 9/2013 |
| CN | 103490029 A | 1/2014 |
| CN | 203690439 U | 7/2014 |
| CN | 105144463 A | 12/2015 |
| CN | 204966568 U | 1/2016 |

(Continued)

OTHER PUBLICATIONS

Machine translation of the abstract of JP 2016-018634, published on Feb. 1, 2016 (Year: 2016).*
Machine translation JP 2016-018634, published on Feb. 1, 2016 (Year: 2016).*
International Search Report from Corresponding Application No. PCT/CN2016/075353 dated Dec. 1, 2016.
Japanese Office Action dated Apr. 23, 2019 for corresponding Japanese Application No. 2018-517280 and English translation.
Extended European Search Report dated Oct. 8, 2019 for corresponding European Application No. 16892012.2.
Chinese Office Action dated Mar. 31, 2020 for corresponding Chinese Application No. 201680054463.3 and English translation.

*Primary Examiner* — Anca Eoff
(74) *Attorney, Agent, or Firm* — Pearne & Gordon LLP

(57) ABSTRACT

The present invention provides a battery module, including: a plurality of power batteries, module casing, separating plate, battery connecting strips, detecting terminals and cell module controller; the power batteries are disposed in module casing, separating plate is arranged above power batteries, through-holes are arranged on separating plate corresponding to electrode terminals of power batteries, battery connecting strips are arranged above separating plate, and are connected with electrode terminals of power batteries through through-holes, so that all power batteries are electrically connected, cell module controller is arranged above separating plate, press-fit holes are provided on cell module controller, terminal connecting portion is arranged on battery connecting strip, detecting terminal is located between separating plate and cell module controller, one end of detecting terminal is connected with terminal connecting portion, the other end of detecting terminal is provided with press-fit contact, press-fit contact is connected in press-fit with press-fit hole.

10 Claims, 4 Drawing Sheets

(56) References Cited

FOREIGN PATENT DOCUMENTS

| DE | 10 2013 207 357 | * 10/2014 |
|----|----|----|
| EP | 2 495 787 A1 | 5/2012 |
| EP | 2 631 967 A1 | 8/2013 |
| JP | 2016-018634 A | 2/2016 |

* cited by examiner

BATTERY MODULE

CROSS-REFERENCE TO RELATED APPLICATIONS

The present application is a continuation of and claims priority to International Application No. PCT/CN2016/075353, filed on Mar. 2, 2016, the content of which is incorporated herein by reference in its entirety.

TECHNICAL FIELD

The present invention relates to the field of battery technologies and, particularly, relates to a battery module.

BACKGROUND

As the promulgation of national laws and regulations relating to restriction of fuel consumption, how to reduce fuel consumption of vehicles has become the problem that many manufacturers try to solve, therefore, increasing the production of new energy vehicles has become an important approach for the manufacturers to solve the fuel consumption problem, thus, it is necessary to develop and improve battery pack technologies.

The key factor which limits the development of the battery pack technologies is that the energy of a battery pack is difficult to improve. There are many manners to increase the energy density of a battery pack, one of which is to improve the integration level of internal components of the battery pack, that is, improve the integration level of each component in a limited space as much as possible, so as to increase the energy density of the battery pack. At present, a majority of battery packs have a battery module, a cell module controller (Cell Module Controller, CMC), a battery management unit (Battery Management Unit. BMU) and other relevant components in their interiors. The cell module controller collects voltage temperature signals of batteries in a battery module, and transmits the signals to the battery management unit, and then the battery management unit controls charging and discharging of the battery. Generally, a plurality of cell module controllers are integrated in a battery pack, the number of the cell module controllers is generally corresponding to the number of the battery modules, the volume occupied by the cell module controller will reduce the energy density of the battery pack.

At present, most of the cell module controllers are disposed outside a battery module, the volume of the cell module controllers is big, the number is large, and the space occupied in a battery pack is big, which is disadvantage in increasing the energy density of the battery pack.

At the same time, in most of the existing schemes, the cell module controller is disposed outside the battery module, the cell module controller is connected with the battery module mainly through a wiring harness connection. Although the wiring harness connection is simple and is easy to implement, but with complex installation, high manual work dependency, low efficiency, and is easy to cause mistakes during installation, the risk thereof is high. When an extreme situation occurs in a battery, the wiring harness is easily damaged, which may cause a short circuit that will raise the danger level of a battery in extreme situations. Therefore, a new and safer connection manner between the cell module controller and the battery module with higher efficiency is needed.

SUMMARY

The present invention provides a battery module, so as to overcome the problems in background that high installation risk exists when adopting wiring harness to connect the cell module controller and the battery module, and raising of the danger level of a battery in an extreme situation.

The present invention provides a battery module, including: a plurality of power batteries, a module casing, a separating plate, battery connecting strips, detecting terminals and a cell module controller;

the power batteries are disposed in the module casing, the separating plate is arranged above the power batteries, and through-holes are arranged on the separating plate corresponding to electrode terminals of the power batteries, the battery connecting strips are arranged above the separating plate, and are connected with the electrode terminals of the power batteries through the through-holes, so that all the power batteries are electrically connected, the cell module controller is arranged above the separating plate, and press-fit holes are provided on the cell module controller, a terminal connecting portion is arranged on the battery connecting strip, the detecting terminal is located between the separating plate and the cell module controller, one end of the detecting terminal is connected with the terminal connecting portion, the other end of the detecting terminal is provided with a press-fit contact, the press-fit contact is connected in press-fit with the press-fit hole.

Preferably, material of the detecting terminal is same as that of the terminal connecting portion, the detecting terminal is connected with an end of the terminal connecting portion through laser welding.

Preferably, also including joint blocks, a first connecting hole is provided on the terminal connecting portion, a second connecting hole is provided at an end of the detecting terminal away from the press-fit contact, one end of the joint block protrudes into the first connecting hole, and is connected with the terminal connecting portion; the other end of the joint block protrudes into the second connecting hole, and is connected with the detecting terminal.

Preferably, material of the joint block is same as that of the terminal connecting portion, material of the detecting terminal is different from that of the terminal connecting portion and the joint block, the joint block is fixed with the terminal connecting portion through a laser welding seam, the joint block is fixed with the detecting terminal through riveting or an ultrasonic welding seam.

Preferably, a first embossment and a second embossment are arranged at two ends of the joint block respectively, the first embossment protrudes into the first connecting hole, and an edge of the first embossment abuts the first connecting hole, the second embossment protrudes into the second connecting hole, and an edge of the second embossment abuts the second connecting hole.

Preferably, the terminal connecting portion is an extending strip, one end of the extending strip is connected with the battery connecting strip, the other end of the extending strip extends towards a direction away from the battery connecting strip, and is connected with the detecting terminal.

Preferably, the terminal connecting portion is a flexible structure.

Preferably, the flexible structure is a Z-shaped structure.

Preferably, the detecting terminal is partially located in the separating plate, and is fixedly connected with the separating plate, the detecting terminal is connected with a lower side of the terminal connecting portion.

Preferably, the battery connecting strips are all arranged on two opposite sides along a length direction of the separating plate, a gap is provided between two rows of the battery connecting strips, the terminal connecting portions extend into the gap, the cell module controller is arranged above the gap.

Preferably, the battery connecting portion includes an arch portion and two connecting sheets, the two connecting sheets are connected with each other through the arch portion, each connecting sheet is connected with the different electrode terminals of the power battery.

The battery module provided by the present invention does not adopt the wiring harness, through integrating the cell module controller in the battery module, and adopting the manner that the detecting terminal is directly connected to the terminal connecting portion on the battery connecting strip and, at the same time, adopting the press-fit process, press-fit contacts are arranged on another end of the detecting terminal and connected with the press-fit holes on the cell module controller, which significantly shortens the spacing distance between the cell module controller and the battery connecting strips, and also simplifies the connecting structure, thereby reducing the risk during installation, and reducing the danger level of the battery in extreme situations.

BRIEF DESCRIPTION OF DRAWINGS

In order to explain the technical solutions in embodiments of the present invention or in the prior art more clearly, a brief introduction of the drawings used in the embodiments or the prior art will be provided here, obviously, the drawings described below are some embodiments of the present invention, those skilled in the art can also obtain other drawings according to these drawings without creative work.

REFERENCE SIGNS

10—power battery
20—module casing
30—separating plate
40—battery connecting strip
400—terminal connecting portion
402—first connecting hole
404—arch portion
406—connecting sheet
50—detecting terminal
500—press-fit contact
502—second connecting hole
60—cell module controller
600—press-fit hole
70—joint block
700—first embossment
702—second embossment
703—upset head

DESCRIPTION OF EMBODIMENTS

In order to make the objects, technical solutions and advantages of embodiments of the present invention more clearly, the technical solutions in the embodiment of the present invention will be described clearly and completely combing the accompanying drawings in the embodiments of the present invention, obviously, the described embodiments are only part of the embodiments of the present invention, but not all of them, other embodiments obtained by those skilled in the art without creative work are all belonging to the protection scope of the present invention.

Figure 1:
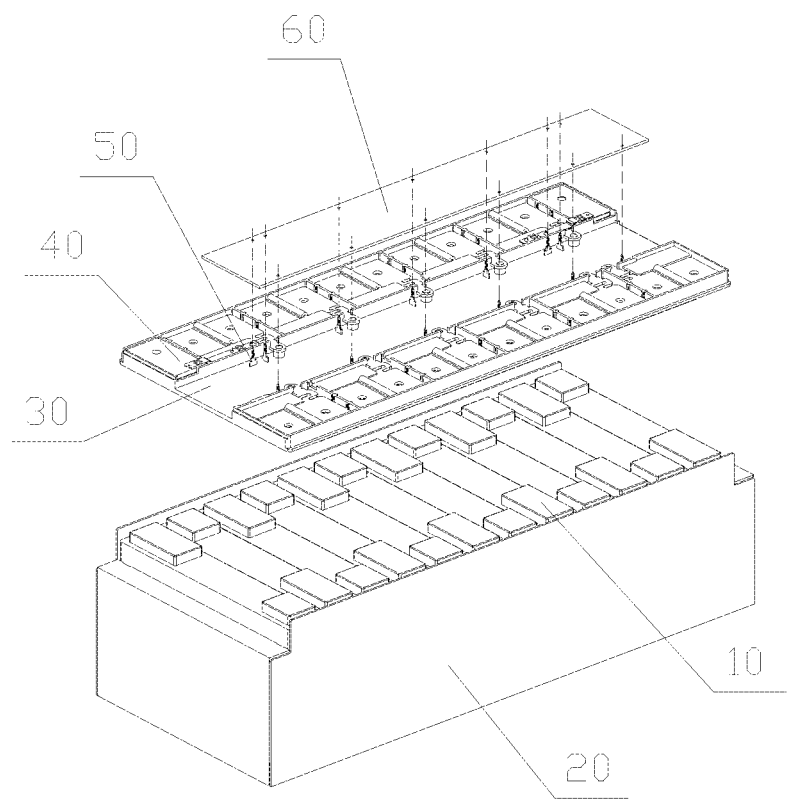
FIG. 1 is an explosive view of a battery module provided by an embodiment of the present invention.
Figure 2:
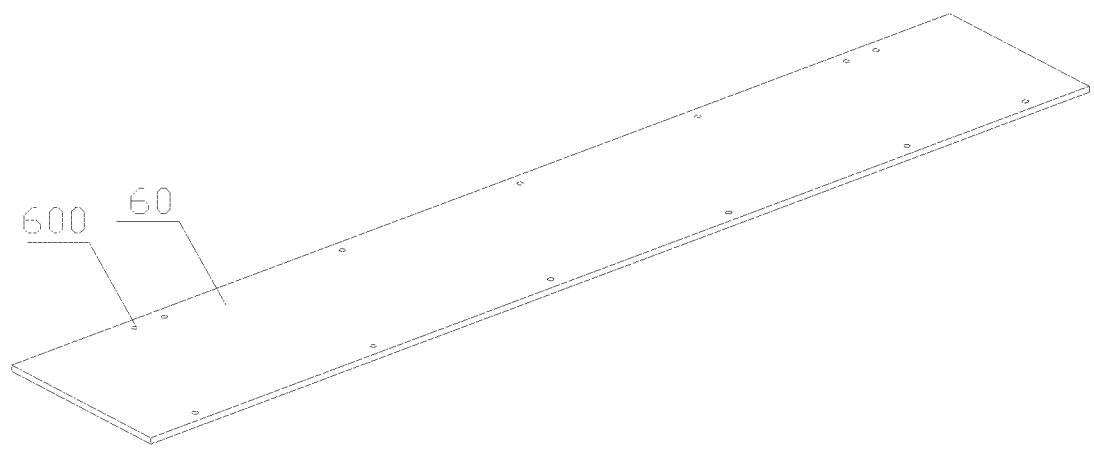
FIG. 2 is a schematic diagram of an integral structure of a cell module controller provided by an embodiment of the present invention.
Figure 6:
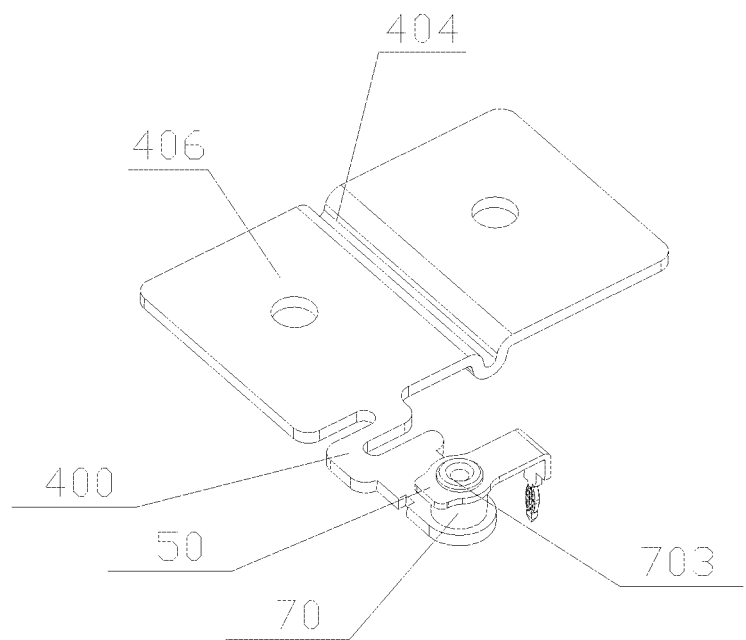
FIG. 6 is a rear structural schematic diagram of the second connecting manner between the battery connecting strip and the detecting terminal provided by an embodiment of the present invention.

As shown in FIG. 1 and FIG. 6, a battery module provided by the present embodiment includes power batteries 10, a module casing 20, a separating plate 30, battery connecting strips 40, detecting terminals 50 and a cell module controller 60. Wherein, the number of the power batteries 10 is relatively large, which are disposed in parallel in the module casing 20, the separating plate 30 is arranged above these power batteries 10, the power batteries 10 are sealed in a chamber formed by the module casing 20 and the separating plate 30. Through-holes, through which electrode terminals protrude, are arranged on the separating plate 30 at positions corresponding to the electrode terminals of the power batteries 10, the battery connecting strips 40 are arranged above the separating plate 30, and are connected with the electrode terminals of the power batteries 10 through the through-holes, all the power batteries 10 can be connected together to constitute a circuit through the battery connecting strips 40, these power batteries 10 can be connected with each other in series or in parallel. The cell module controller 60 is arranged above the separating plate 30, as shown in FIG. 2, press-fit holes 600 are provided on the cell module controller 60, a terminal connecting portion 400 is arranged on the battery connecting strip 40, the press-fit holes 600 and the terminal connecting portion 400 are used for the connection of the detecting terminals 50. Specifically, the detecting terminal 50 is located between the separating plate 30 and the cell module controller 60, an end of the detecting terminal 50 is connected with the terminal connecting portion 400, a press-fit contact 500 is arranged at the other end of the detecting terminal 50, the press-fit contact 500 is connected in press-fit with the press-fit hole 600. During the press-fit process, the press-fit contact 500 will deform, which provides certain holding power for the connection, so as to achieve electric signal transmission between the battery connecting strip 40 and the cell module controller 60.

The battery module provided by the present embodiment does not adopt the wiring harness, through integrating the cell module controller 60 in the battery module, the spacing distance between the cell module controller 60 and the battery connecting strip 40 is significantly shortened, which makes the battery pack space occupied by the cell module controller 60 become smaller, therefore, relative larger space can be provided in the battery pack for accommodating more battery modules, so as to improve the energy density of the battery pack. Furthermore, since the manner that the detecting terminal 50 is directly connected to the terminal connecting portion 400 on the battery connecting strip 40 is adopted, meanwhile, the press-fit contacts 500 are arranged on the other end of the detecting terminal 50 and are connected with the press-fit hole 600 on the cell module controller 60, which also simplifies the connecting structure between the cell module controller 60 and the battery connecting strip 40, thereby reducing the risk during installation, and reducing the danger level of the battery in extreme situations, so as to improve the safety and reliability of the battery module and, at the same time, improve the production efficiency of the battery module as well.

In the present embodiment, according to different situations, different connecting manners are provided between the detecting terminal 50 and the terminal connecting portion 400.

Figure 3:
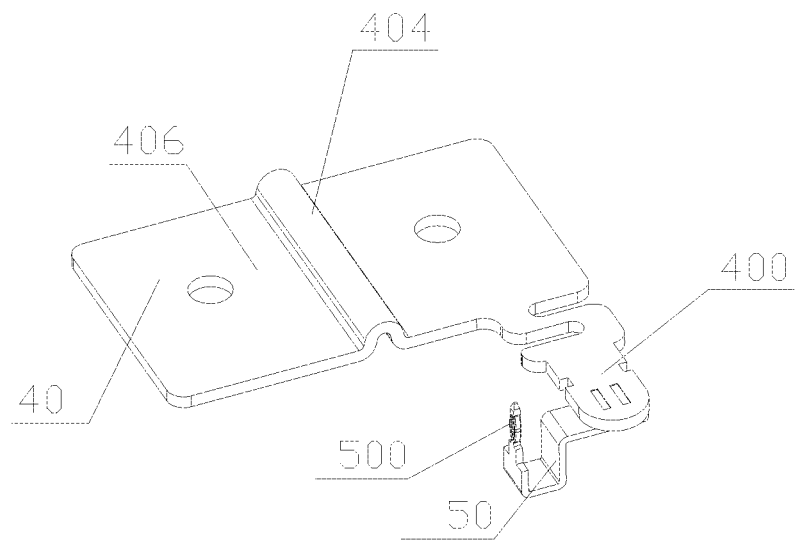
FIG. 3 is a structural schematic diagram of a first connecting manner between a battery connecting strip and a detecting terminal provided by an embodiment of the present invention.

Manner One: as shown in FIG. 3, if the material of the detecting terminal 50 is same as that of the terminal connecting portion 400, then the detecting terminal 50 can be directly connected with an end of the terminal connecting portion 400 via a laser welding seam formed by laser welding.

Figure 4:
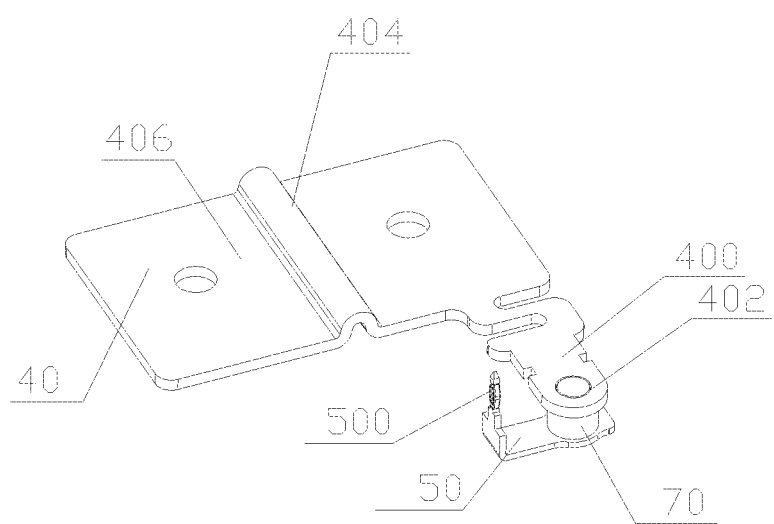
FIG. 4 is a front structural schematic diagram of a second connecting manner between a battery connecting strip and a detecting terminal provided by an embodiment of the present invention.
Figure 5:
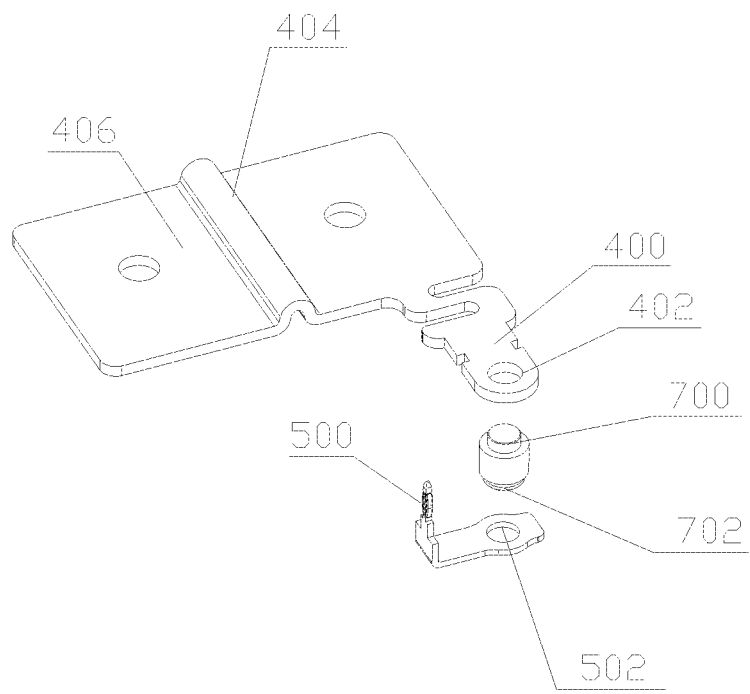
FIG. 5 is an explosive view of the second connecting manner between the battery connecting strip and the detecting terminal provided by an embodiment of the present invention.

Manner Two: as shown in FIGS. 4-6, a joint block 70 is arranged between the terminal connecting portion 400 and the detecting terminal 50, and a first connecting hole 402 is provided on the terminal connecting portion 400, a second connecting hole 502 is provided at an end of the detecting terminal 50 away from the press-fit contact 500. When assembling, one end of the joint block 70 protrudes into the first connecting hole 402, and is connected to the terminal connecting portion 400, the other end of the joint block 70 protrudes into the second connecting hole 502, and is connected to the detecting terminal 50. When the material of the detecting terminal 50 is different from that of the terminal connecting terminal 400, the connection therebetween can be achieved better using this structure. Specifically, the joint block 70 can adopt the material same as that of the terminal connecting portion 400, thus, the material of the joint block 70 is different from that of the detecting terminal 50, therefore, they can be fixed in a riveting manner, if there is enough space, they can be fixed via an ultrasonic welding seam formed by ultrasonic welding, or in order to further improve the fastness degree, a welding seam is formed by welding so as to strengthen the connection after the riveting fixing. After the joint block 70 is connected to the detecting terminal 50, since the material of the joint block 70 is same as that of the terminal connecting portion 400, therefore, laser welding can be adopted for fixing.

In order to make the connection between the joint block 70 and terminal connecting portion 400 as well as the detecting terminal 50 more firm, and to simplify the assembling process, as shown in FIG. 5, in the present embodiment, a first embossment 700 and a second embossment 702 are arranged on two ends of the joint block 70 respectively, the second embossment 702 can protrude into the second connecting hole 502, and an edge of the second embossment 702 can abut the second connecting hole 502, a structure such as buckling is formed therebetween. An upset head 703 is formed after the second embossment 703 is riveted with the detecting terminal 50, thereby further improving the fastness degree of the connection, a welding seam can be formed at the upset head 703 by welding so as to firm the connection. The first embossment 700 can also protrude into the first connecting hole 402, after protruding, an edge of the first embossment 702 can also abut the first connecting hole 402, so that a structure such as buckling can be formed between the first embossment 700 and the first connecting hole 402, then the gap between the first embossment 700 and the first connecting hole 402 can be welded through laser welding.

Figure 7:
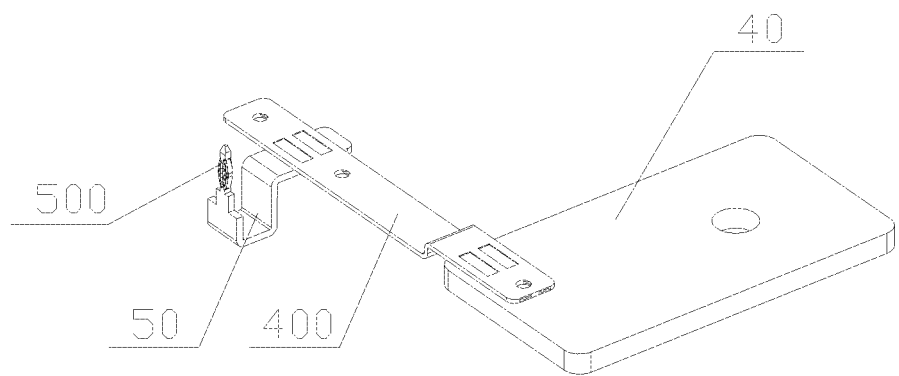
FIG. 7 is a structural schematic diagram of a third connecting manner between a battery connecting strip and a detecting terminal provided by an embodiment of the present invention.
Figure 8:
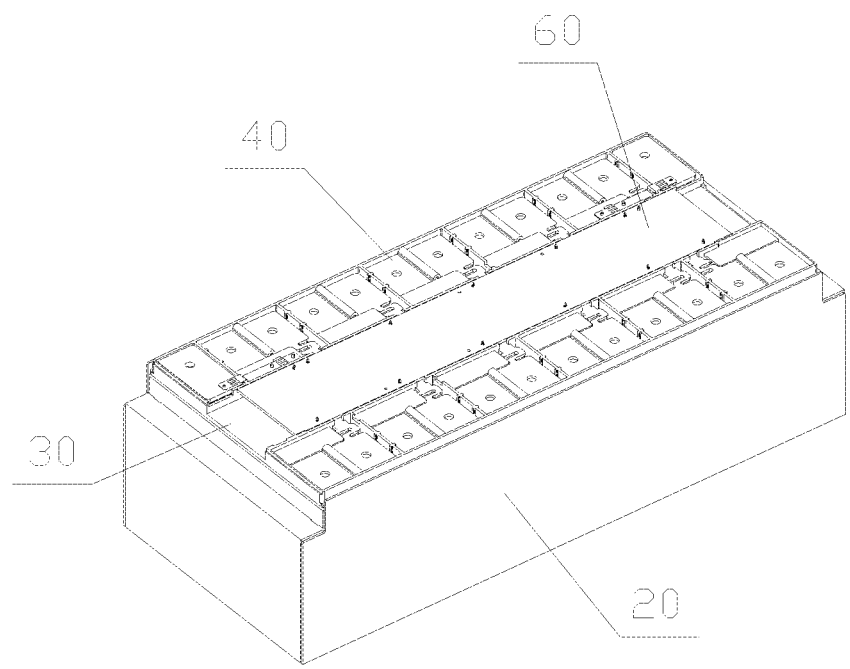
FIG. 8 is a schematic diagram of an integral structure of a battery module provided by an embodiment of the present invention.

Manner Three: as shown in FIG. 7, when the battery connecting strip 40 is far away from the press-fit hole 600 corresponding to the detecting terminal 50, in order to facilitate connecting, the length of the terminal connecting portion 400 can be extended, so as to form an extending strip, then one end of the extending strip is connected with the battery connecting strip 40, the other end of the extending strip extends to the vicinity of the press-fit hole 600, and is connected to the detecting terminal 50.

In the above three manners, all the terminal connecting portions 400 can be flexible structures, for example, arranged as a Z-shaped structure so as to increase the elastic deformation ability, thereby absorbing the stress generated during the connecting process, which makes the connection structure more stable. Meanwhile, in the first and second connecting manner, since the terminal connecting portion 400 is of a relative short length, therefore, an integrated structural design can directly be adopted with the battery connecting strip 40, so as to simplify the manufacturing and assembling method. In the third manner, since the terminal connecting portion 400 needs to extend for a relative long distance, and is of a larger length size, therefore, the terminal connecting portion 400 can be manufactured alone using a material with higher intensity.

In the present embodiment, in order to further simplify the assembling method and increase the assembling accuracy, a portion of the detecting terminal 50 can protrude into the separating plate 30 and is fixed therein, so that the detecting terminal 50 is directly fixed on the separating plate 30. At this time, both ends of the detecting terminal 50 have separating plate 30 that protrudes upward, one end thereof protrude to the underneath of the terminal connecting portion 400, and is connected with the lower side surface of the terminal connecting portion 400, and the end with the press-fit contact 500 is also in a fixed position. As long as the position of the press-fit contact 500 is corresponding to the position of the press-fit hole 600 on the cell module controller 60, all the press-fit contacts 500 can be inserted into corresponding press-fit holes 600 while the cell module controller 60 is buckled on the above of the separating plate 30.

Referring to FIG. 1 and FIG. 6, in order to further improve the integration level of the battery module, and reduce volume thereof, the battery connecting strips 40 in the present embodiment are all arranged on two opposite sides along the length direction of the separating plate 30, a certain gap is provided between two rows of the battery connecting strips 40, all the terminal connecting portions 400 protrude into the gap, the size and the shape of the gap are substantially the same as those of the cell module controller, the cell module controller 60 is arranged above the gap. Thus, the battery connecting strip 40 will not exist under the cell module controller 60, which further reduces the spacing distance between the cell module controller 60 and the separating plate 30, so as to improve the integration level of the battery module and reduce the volume thereof.

Since a tolerance exists in the height direction of the power battery 10, and a height difference also exists during the assembling process of each power battery 10, therefore, the battery connecting strips 40 are likely to bear the connection stress caused by the height difference when connecting to each power batteries 10. In order to eliminate the stress, as shown in FIGS. 3-6, the battery connecting strip 40 in the present embodiment includes an arch portion 404 and two connecting sheets 406, the two connecting sheets 406 are connected with each other through the arch portion 404, the arch portion 404 has a relative large capability of elastic deformation, therefore, when each connecting sheet 406 is connected with different electrode terminals of the power battery 10, the stress can be absorbed by the elastic deformation of the arch portion 404, so as to make the connection structure between the connecting sheet 406 and the power battery 10 more stable.

The battery module provided by the present embodiment reduces the installation risk, and reduces the danger level of the battery in an extreme situation so as to improve the safety and reliability of the battery module and also, at the same time, improve the manufacture efficiency of the battery module. Besides, the battery module also reduces the space occupied by the battery detecting elements, thereby increasing the energy density of the battery pack.

It should be noted that: the above embodiments are just used to explain the technical solutions of the present invention, rather than limiting; although the present invention is explained in detail referring to the above-mentioned embodiments, those skilled in this art should understand: the above-mentioned technical solution of each embodiment can be modified, or any equivalent replacements can be made to part or all of the technical features; however, these modifications or replacements will not let the essence of corresponding technical solutions depart from the spirit and scope of the technical solution of each embodiment of the present invention.

What is claimed is:

1. A battery module, characterized in that, comprising: a plurality of power batteries, a module casing, a separating plate, battery connecting strips, detecting terminals and a cell module controller;

the power batteries are disposed in the module casing, the separating plate is arranged above the power batteries, and through-holes are arranged on the separating plate corresponding to electrode terminals of the power batteries, the battery connecting strips are arranged above the separating plate, and are connected with the electrode terminals of the power batteries through the through-holes, so that all the power batteries are electrically connected, the cell module controller is arranged above the separating plate, and press-fit holes are provided on the cell module controller, a terminal connecting portion is arranged on the battery connecting strip, the detecting terminal is located between the separating plate and the cell module controller, one end of the detecting terminal is connected with the terminal connecting portion, the other end of the detecting terminal is provided with a press-fit contact, the press-fit contact is connected in press-fit with the press-fit hole; and the detecting terminal is partially located in the separating plate, is fixedly connected with the separating plate, and is connected with a lower side of the terminal connecting portion.

2. The battery module according to claim 1, characterized in that, material of the detecting terminal is same as that of the terminal connecting portion, the detecting terminal is connected with an end of the terminal connecting portion through laser welding.

3. The battery module according to claim 1, characterized in that, further comprising joint blocks, a first connecting hole is provided on the terminal connecting portion, a second connecting hole is provided at an end of the detecting terminal away from the press-fit contact, one end of the joint block protrudes into the first connecting hole, and is connected with the terminal connecting portion; the other end of the joint block protrudes into the second connecting hole, and is connected with the detecting terminal.

4. The battery module according to claim 3, characterized in that, material of the joint block is same as that of the terminal connecting portion, material of the detecting terminal is different from that of the terminal connecting portion and the joint block, the joint block is fixed with the terminal connecting portion through a laser welding seam, the joint block is fixed with the detecting terminal through riveting or an ultrasonic welding seam.

5. The battery module according to claim 3, characterized in that, a first embossment and a second embossment are arranged at two ends of the joint block respectively, the first embossment protrudes into the first connecting hole, and an edge of the first embossment abuts the first connecting hole, the second embossment protrudes into the second connecting hole, and an edge of the second embossment abuts the second connecting hole.

6. The battery module according to claim 1, characterized in that, the terminal connecting portion is an extending strip, one end of the extending strip is connected with the battery connecting strip, the other end of the extending strip extends towards a direction away from the battery connecting strip, and is connected with the detecting terminal.

7. The battery module according to claim 1, characterized in that, the terminal connecting portion is a flexible structure.

8. The battery module according to claim 7, characterized in that, the flexible structure is a Z-shaped structure.

9. The battery module according to claim 1, characterized in that, the battery connecting strips are all arranged on two opposite sides along a length direction of the separating plate, a gap is provided between two rows of the battery connecting strips, the terminal connecting portions extend into the gap, the cell module controller is arranged above the gap.

10. The battery module according to claim 1, characterized in that, the battery connecting strip comprises an arch portion and two connecting sheets, the two connecting sheets are connected with each other through the arch portion, each connecting sheet is connected with the different electrode terminals of the power battery.

* * * * *